April 5, 1966     E. BOURGEOIS     3,244,386
SHOCK AND VIBRATION ABSORBING SUSPENSION FOR VEHICLE MOTORS
Filed April 20, 1964     2 Sheets-Sheet 1

April 5, 1966  E. BOURGEOIS  3,244,386
SHOCK AND VIBRATION ABSORBING SUSPENSION FOR VEHICLE MOTORS
Filed April 20, 1964  2 Sheets-Sheet 2

United States Patent Office 3,244,386
Patented Apr. 5, 1966

3,244,386
**SHOCK AND VIBRATION ABSORBING SUSPEN-
SION FOR VEHICLE MOTORS**
Edouard Bourgeois, Paris, France, assignor of fifty percent to Societe Commerciale Paulstra, Levallois-Perret, France, a society of France
Filed Apr. 20, 1964, Ser. No. 361,109
Claims priority, application France, Apr. 24, 1963, 932,574
2 Claims. (Cl. 248—9)

The present invention relates to resilient devices serving to ensure protection against shocks and vibrations, and in particular to those to be interposed between a vehicle and the engine by which it is driven. Such devices must have a relatively great resiliency in two directions perpendicular to each other whereas a relative stiffness is to be ensured in a direction prependicular to both of the first mentioned directions.

The chief object of the present invention is to provide a device of this kind which is simpler and more efficient than those existing at the present time.

According to an essential feature of the present invention such a device comprises two elements, at least approximately cylindrical, one surrounding the other, with the interposition of at least one rubber mass adhesive to portions, located opposite each other, of said elements, said portions being chosen in such manner that the whole produces first a suitable resiliency in the direction of an axis passing through said elements and parallel to the generatrices thereof, secondly some rigidity, by compression of the rubber mass, in the direction of an axis perpendicular to the first one and transverse to said generatrices, and finally a suitable resiliency in the direction of a third axis perpendicular the two first ones.

According to another feature of the present invention the active faces of the above mentioned elements are located along the branches of two V, located one inside the other, in such manner that the displacements parallel to the common bissector of said V cause the rubber to be subjected both to a shearing stress and to a compression or pulling stress.

Preferred embodiments of the present invention will be hereinafter described with reference to the appended drawings, given merely by way of example, and in which.

It will first be reminded that it is of interest, when a part is being supported by another part and in particular an engine is being supported by the automobile vehicle driven by it, to arrange the device in such manner as to have different resiliencies in three directions each perpendicular to the two others. As a matter of fact, such an engine suspension should have a rather great resiliency or flexibility in the vertical direction ($z$—$z'$ on the drawings) although being capable of supporting the weight of the engine, a great transverse resiliency in the horizontal direction transverse to the vehicle ($y$—$y'$ on the drawings) and, on the contrary, some stiffness in the horizontal and longitudinal direction, that is to say in the direction in which accelerations and brakings take place ($x$—$x'$ on the drawings).

In order to comply with these conditions, the device according to the present invention comprises two elements, to wit a rigid core and a casing surrounding said core, connected together through at least one rubber mass secured to said rigid elements along some portions of the respective surfaces thereof, said portions being chosen in such manner as to ensure a great resiliency or flexibility in the direction of an axis $y$—$y'$ passing inside said elements, a relatively great resiliency along an axis $z$—$z'$ perpendicular to the preceding one, and, on the contrary, some stiffness along an axis $x$—$x'$ perpendicular the first and second mentioned axes. In a general manner, the deformations parallel to this last mentioned axis $x$—$x'$ will subject the rubber material to compression or pulling stresses, whereas the relative movements in direction $y$—$y'$ and $z$—$z'$ subject said rubber material chiefly the shearing stresses.

In order to obtain this result the device will be arranged in such manner:

That the external rigid casing has the general shape of a cylindrical ring the middle plane of which is vertical or substantially so, and That the inner core connected to said ring through said rubber mass imparts to said elements, stresses as above indicated; axis $z$—$z'$ being substantially vertical, whereas axis $y$—$y'$, which passes inside the two rigid elements, is horizontal and transverse to the vehicle and axis $x$—$x'$ is horizontal and longitudinal.

Advantageously, to take into account the reactions due to the weight of the engine in direction $z$—$z'$, the rubber mass is arranged to be partly compressed in this direction. For this purpose, according to the invention, the rigid elements are wedged in each other, comprising, for this purpose, respective V-shaped portions parallel to and located in each other.

Figure 1:
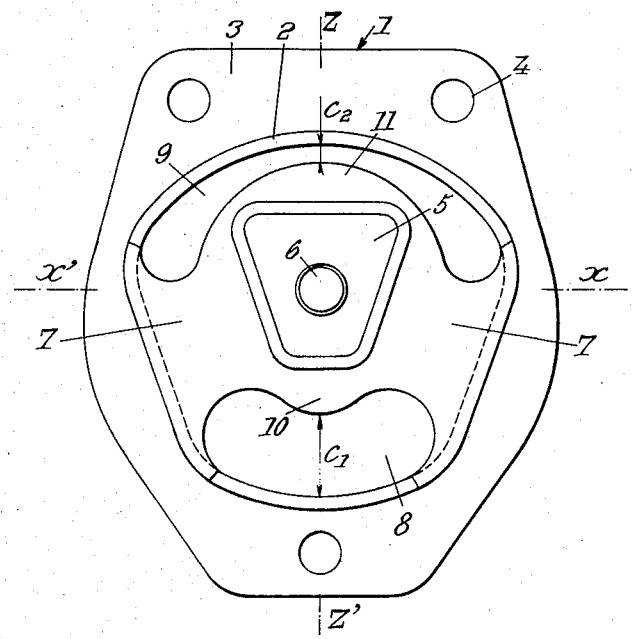
FIG. 1 is an elevational view of a device according to the present invention, said device being subjected to no load.
Figure 2:
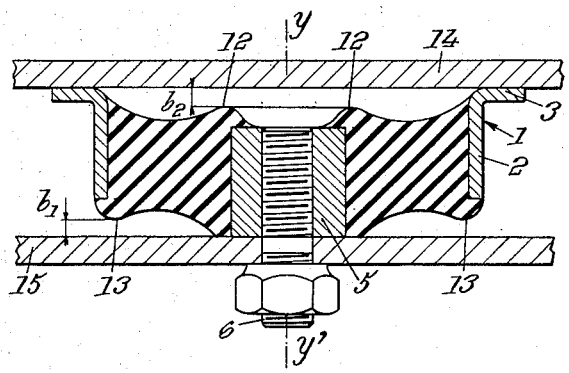
FIG. 2 is a horizontal cross section of the device of FIG. 1.
Figure 3:
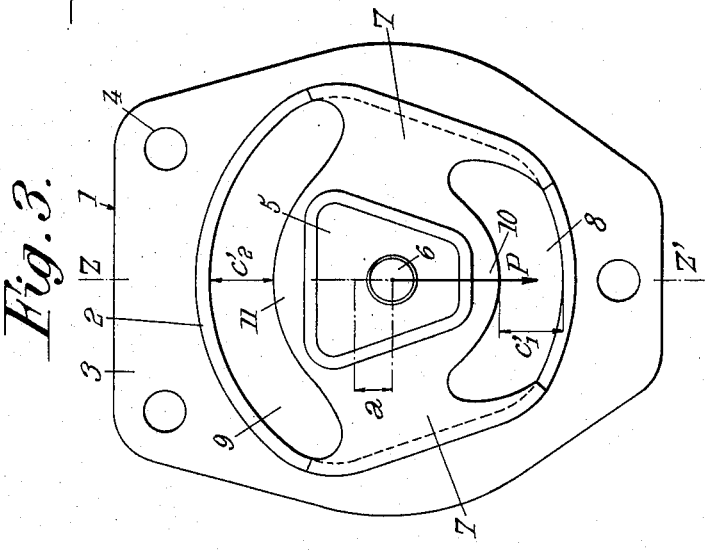
FIG. 3 is a view analogous to FIG. 1, but with a load applied to the device.

In the construction illustrated by FIGS. 1 to 3 the device comprises:

(a) An external rigid casing 1 consisting of a hoop 2 substantially in the form of a portion of a cylinder of trapezoidal cross-section, including a flange 3 provided with holes 4 for its fixation to a plate 14, (b) An inner rigid core 5, also of substantially trapezoidal cross section, this element 5 being for instance solid and containing a fixation screw 6 for securing it to plate 15, and (c) A vulcanized rubber mass serving to connect elements 1 and 5 together, said rubber mass being adherent to said elements 1 and 5.

The rubber mass surrounds rigid core 5 over the whole periphery thereof. It comprises two portions 7 interposed between the parallel and substantially plane side faces of elements 1 and 5, two free spaces 8 and 9 being provided in the rubber mass to facilitate relative movements, in the direction $z$—$z'$, of core 5 with respect to casing 1. These movements are limited by the provision of two projections 10 and 11 of the rubber mass, adapted to come into contact with hoop 2, projection 10 cooperating with said hoop 2 after a displacement $c_1$ of core 5 in the downward direction and projection 11 cooperating with said hoop 2 after a displacement $c_2$ in the upward direction.

The rubber mass also includes, as shown in FIG. 2, two annular projections 12 and 13 intended resiliently to limit the amplitude of the movements of core 5 in the direction of axis $y$—$y'$ to values $b_1$ and $b_2$ substantially equal to each other.

Such supporting devices are intended to be mounted in such manner that the main static load P is applied in the direction $z$—$z'$. This will be the vertical direction if the load is a weight, as supposed when the invention is applied as above stated, where axis $y$—$y'$ is horizontal and transverse to the vehicle whereas axis $x$—$x'$ is longitudinal.

In the case of FIGS. 1 to 3, casing 1 is secured, for instance by means of bolts, through its flange 3, to plate 14 and the load is applied to core 5 through plate 15. Of course the reverse arrangement is possible, but in this case the support is turned upside down.

Plates 14 and 15 must have a flat area sufficient to cooperate with abutments 12 and 13.

The device works as follows:

In the direction $z$—$z'$ of action of force P, rubber block 7 is shear-stressed with a small compression applied thereto due to the obliquity of the side faces of parts 2 and 5, which ensures a very good resiliency together with a good safety of the glueing connection between the rubber block and the metal elements.

In the axial direction $y$—$y'$, the rubber block is also shear-stressed with a very great resiliency.

In the direction $x$—$x'$, the rubber block is subjected to compression and pulling stresses, and therefore has a substantial stiffness.

The dimensions of the supporting device and the characteristics of the rubber material are chosen in accordance with the load P in such manner that, under the effect of said load, the deflection $a$ produced by the effect of the load is such that the free displacement on either side of the position of equilibrium is the same (FIG. 3):

$$c'_1 = c_1 - a = c_2 + a = c'_2$$

Figure 4:
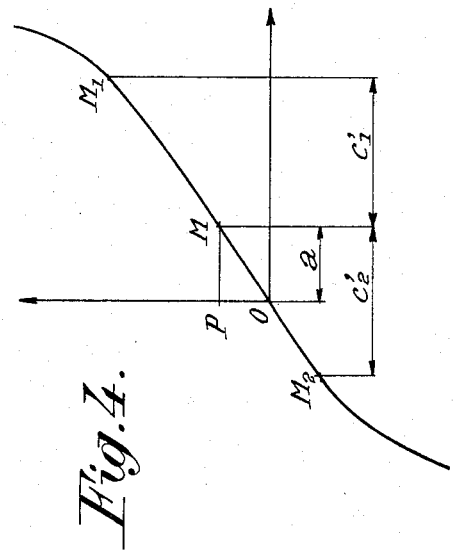
FIG. 4 shows a diagram illustrating the operation of such a device.

In these conditions, the curve of variation of the load in acordance with the deflection is represented by FIG. 4. To the normal load P corresponds point M (deflection $a$). Under the effect of a load variation the representative point may move on the one hand as far as $M_1$ (overload), on the other hand as far as $M_2$ (rebounding), the corresponding displacement $c'_1$ and $c'_2$ being substantially equal to each other. Beyond $M_1$, abutment 10 is brought into play (limitation of the overload) and beyond $M_2$, abutment 11 is brought into play (limitation of the reboundings). Outside of portion $M_1$ $M_2$ of the curve, the rigidity increases very quickly when the load increases.

Figure 5:
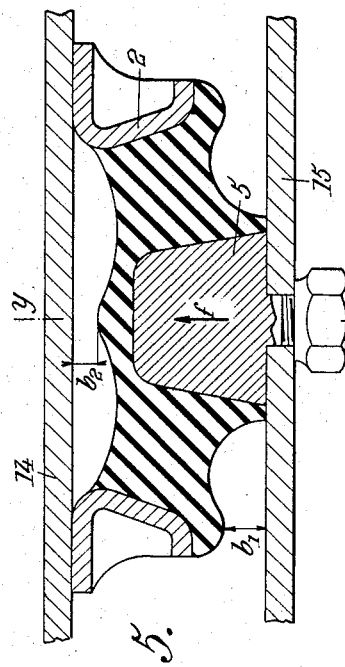
FIG. 5 is a sectional view analogous to FIG. 2 illustrating a modification.

Of course the above mentioned embodiment has been described merely by way of example. In a modification, shown by FIG. 5, where it is desired to have an increased rigidity in the direction of arrow $f$, the opposed parallel faces 2 and 5 are given a substantial obliquity with respect to axis $y$—$y'$. Otherwise the device is the same.

The connecting device according to the present invention has many advantages among which the following ones may be cited:

It works in a more logical manner on account of the resiliencies to be provided in the three directions of space;

Its cost is relatively low;

And its mounting is easy.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. For use between an automobile vehicle and the engine by which it is driven, a suspension device which comprises, in combination, two rigid elements, one of said elements being annular and surrounding the other, said annular rigid element being rigidly attachable to said vehicle and the other rigid element being rigidly attachable to said engine, said rigid elements having, in normal position, a common horizontal axis disposable perpendicular to the fore-and-aft direction of said vehicle and each of said rigid elements including two flat faces substantially parallel to the sides of a V, the same for both of said elements and having its plane of symmetry vertical, rubber means secured to said rigid elements and extending between the respective flat faces thereof so as to be stressed both in compression and in shearing, and rubber means carried by the inner rigid element at a distance from the top and bottom inner faces of said annular rigid element for abutting against said top and bottom inner faces after given vertical displacements of said inner rigid element with respect to said annular rigid element.

2. For use between an automobile vehicle and the engine by which it is driven, a suspension device which comprises, in combination, two rigid elements both of general cylindrical shape, one of said elements being tubular and surrounding the other, said annular rigid element being rigidly attachable to said vehicle and the other rigid element being rigidly attachable to said engine, said rigid elements having, in normal position, a common horizontal axis disposable perpendicular to the fore-and-aft direction of said vehicle and each of said rigid elements including two flat faces substantially parallel to the sides of a V, the same for both of said elements and having its plane of symmetry vertical, and a rubber mass secured to said two rigid elements along said rigid element flat faces, said rubber mass surrounding the inner rigid element, with empty spaces between the top and bottom portions of said rubber mass and the top and bottom inner faces of said tubular rigid element, said empty spaces being substantially of the same height in the position of rest of the device.

References Cited by the Examiner

UNITED STATES PATENTS 2,948,502  8/1960  Hutton _____ 248—358

FOREIGN PATENTS 593,121  10/1947  Great Britain.
808,842  2/1959  Great Britain.
834,920  5/1960  Great Britain.
167,025  12/1959  Sweden.
328,176  2/1958  Switzerland.

CLAUDE A. LE ROY, *Primary Examiner.*

CHANCELLOR E. HARRIS, *Examiner.*

FRANK L. ABBOTT, J. PETO, *Assistant Examiners.*